Patented Feb. 22, 1949

2,462,253

UNITED STATES PATENT OFFICE 2,462,253

PRODUCTION AND USE OF SYNTHETIC RESIN

Raymond G. Booty, Elmwood Park, Ill., assignor to Weyerhaeuser Timber Company, Tacoma, Wash., a corporation of Washington No Drawing. Application January 25, 1944, Serial No. 519,646

7 Claims. (Cl. 154—133)

The present invention relates to the manufacture of phenolic-aldehyde resins. It has special reference to the so-called water-soluble phenol formaldehyde condensation products in liquid form for use in the production of solid resin by the action of heat to thermoset the material. In particular it relates to the production of an aqueous liquid solution containing a reactive phenolic resin which is capable of further and rapid condensation or reaction by the action of heat. It also relates to preparing such a resin so that it may be stored for long periods with liquid stability and with retention of its curing properties at high temperatures.

Among the "soluble" reactive resins are the so-called water-soluble phenolic-aldehyde condensation products. These are believed to exist in so-called solution in water in the form of a colloid, but for convenience they are herein termed as "water-soluble." As this type of resin material becomes further advanced towards an insoluble resin, as by long standing, or by the action of heat, a solution thereof becomes more viscous and approaches that point where the resin composition comes out of solution and precipitates or irreversibly gels with the inclusion of its solvent. Such rapidly changing resin solutions are not suitable for many uses in the arts, where it is necessary to hold the resin in storage before use.

Certain conditions of use of such water-soluble resins, as for example, use as or in glues or liquid adhesives, call for suitable viscosity. One way heretofore employed for securing increased viscosity of such a water-soluble resin, is to advance the resin by heat. However, such advancement brings the resin closer to the said precipitation or gel point, and as a result the resin is relatively unstable, and less suitable for long storage.

It is a general object of the present invention to condense a phenol and an aldehyde in a liquid mass in the presence of a thickening agent dispersed in said liquid mass.

It is also an object of the present invention to produce an aqueous solution of a phenol-formaldehyde condensation product which is reactive to provide solid resin, and to produce such solution by use of a special agent for giving it increased viscosity compared to the viscosity which would otherwise result from the degree of advancement or polymerization of the resin content.

It is a particular object of the invention to effect the condensation of a phenol and an aldehyde in the presence of an agent which functions to increase the viscosity of a resulting dispersion of the resin.

It is also an object of the present invention to employ such an agent for effecting a desired viscosity, which agent does not impair, but rather contributes to the stability of the solution.

It is a particular object of the invention to employ methyl cellulose as a thickening agent.

It is a further object of the invention to provide an aqueous resin-containing glue composition, particularly useful for the production of plywood.

It is also an object of the invention to produce plywood having a phenol-aldehyde resin as the essential element of the glue line.

Various other and ancillary objects and advantages of the present invention will become apparent from the following description and explanation of the present invention.

The so-called water-soluble phenolic-aldehyde condensation products are preferably and most commonly produced by condensation of phenol and formaldehyde in aqueous solution in the presence of alkali as a catalyst. It is well-known that the proportion of phenol and formaldehyde, and the kind and quantity of alkali as a catalyst, have definite effects upon the reaction, and upon the specific nature of the resulting condensation product. In general, where a low degree of advancement or polymerization of the resulting condensation product is desired, the resin solution has a comparably low viscosity, which viscosity can be increased by the action of heat to continue the advancement or polymerization. The amount of alkali residual to the reaction product is a sort of colloid-dispersing agent effective to keep the resin in dispersion or solution. Increase of the alkali content adds to the stability of the solution by bettering the dispersion.

It is appreciated that many hydrocolloid materials might be added to increase the viscosity of any particular solution, but where such solutions are subject to long storage, any such colloidal thickening agent must be one which is substantially resistant to change by the presence of the alkali contained in the solution.

I have found that when about 2 parts of methyl cellulose per 100 parts of a phenol are employed in the alkaline condensation of a phenol and an aldehyde, the viscosity of the resulting solution may be made to be roughly about 8 times, for example, the viscosity of a solution prepared under similar circumstances but without using said methyl cellulose. Only a small quantity of methyl cellulose is needed, and the quantity chosen determines the resulting increase of viscosity for a given advancement. More or less than 2 parts per 100 of the phenol may be employed to give resultingly greater and less viscosity than corresponds to the use of said 2 parts.

The importance of higher viscosity for low degree of polymerization is reflected in the use of the resin solution as, or as a base in, a liquid glue for wood fibers, cellulose fibers, paper, cloth, wood, and especially wood veneer in the production of plywood. In these arts a surface bond is most frequently desired, that is, localization of the ultimate resin in a resin layer as a bond, using a glue completely wetting the adjacent surfaces but with a minimum of penetration into the material to be bonded. The higher the viscosity of the solution, the less the penetration into a material normally capable of absorbing it. Thus, on heating, and on loss of water or other solvent liquid from the glue, whereby the resin solids become more concentrated, the bonding composition can pass through a fluid, plastic or flux stage, wherein it flows and wets with lessened surface penetration, into the recesses of the areas to be bonded, finally arriving at a solid stage.

Heretofore, where higher degree of advancement has been employed to secure a considerable and suitable viscosity for application or for spreading of a resin-containing glue composition, with a minimum of penetration, the resin-containing glue composition has passed into the solid state in the process of becoming concentrated, and under circumstances such that it has failed properly to flow in its fluid state to give an adequate bond. Attempts heretofore to use a less advanced resin have resulted in too much penetration, or in a glue composition which is lacking in bonding power where it is so compounded as to have a suitable spreading quality. In many instances the resin has become located to a considerable extent within the materials to be bonded rather than largely at an interface of the bonded materials.

Methyl cellulose is a material which may be dispersed in aqueous solutions under certain conditions. Variation in its methoxyl content affects its solubility. A content of 30 to 32% by weight of methoxyl imparts solubility in water, which is a property useful in preparing resins by the present invention. Lower methoxyl content may impart solubility in alkali solutions and insolubility in water and organic solvents; while higher methoxyl content may impart solubility in organic solvents and insolubility in water. The preferred forms are those having from 30 to 32% methoxyl content. The viscosity of methyl cellulose may be varied by varying the conditions of alkylation independently of the methoxyl content. As used in the examples of the present invention the preferred methyl cellulose of 30 to 32% methoxyl content has a viscosity at 25° C. of 100 centipoises when measured at a 5% by weight dispersion in water.

The following example illustrates the invention and throughout the example parts are given by weight.

*Example 1*

100 parts of water are heated to 95° C. and 20 parts of the above specified preferred methyl cellulose stirred in until well wetted, as will occur in about 15 minutes. The hot wet mass is added to about 600 parts of formaldehyde as 1600 parts of a commercial solution in water of 37% strength by weight. Then to this mass are added 1000 parts of U. S. P. phenol (M. P. 40° C.), and 45 parts of caustic soda as a 37% solution by weight in water.

The mass is allowed to react and kept at 80° C. until a withdrawn specimen has a viscosity of 800 to 900 centipoises when tested at 25° C. The mass is then cooled to 60° C. at a rate of about 70° C. per hour, which will have added about 100 centipoises to its viscosity measured at 25° C. At 60° C., add 15 parts of caustic soda as a 37% solution by weight in water, which further increases the viscosity by about 50 centipoises at 25° C. Cool to 40° F. for storage, thus bringing the viscosity into a range from 1200 to 1300 centipoises at 25° C. The solution is thus stable for long periods of time.

In the foregoing example the formaldehyde solution employed is commercial formalin, containing about 7% of methanol by weight, and a small percentage, for example from .005 to 1% of formic acid by weight. The alkali employed in the reaction is in part utilized to neutralize said formic acid.

The presence of salts, such as sodium formate, in the resulting resin solution increases the tendency for the resin to precipitate or gel from its sol condition when it arrives at a suitable stage of advancement under any circumstances. The additional caustic soda employed at the end of the reaction acts as additional dispersing agent, in part to counteract the various tendencies leading toward early precipitation or gelling.

The well-known variations of the condensation may be applied in the above and in other examples of the condensation. For example, when the catalytic alkali is reduced in quantity, a longer time of reaction is required, and the difference may be added later to attain long-time liquid stability. When formaldehyde is decreased in quantity a longer reaction time is required to reach a comparable viscosity but lowered liquid stability and property changes are encountered; for example, when a glue is made from such resin for plywood as hereinafter described, increased penetration of the applied resin is encountered during pressing.

When formaldehyde is increased, the content of free or uncombined formaldehyde may become excessive, and in such cases may be troublesome in some uses of the resin, as for example by being liberated as free formaldehyde gas in final heating to set the resin. The preferred ratio of phenol to formaldehyde is that given above, being substantially one mole of phenol to 1.87 moles of formaldehyde.

Resin solutions such as are produced by the above Example I are especially suitable for compounding glues for use in producing plywood. In such art, economy of resin base is a commercial objective. This leads to thin but even spreading and to minimizing of penetration into the wood veneer. Spreading involves initial application of a liquid glue to a veneer, followed by flow or distribution between superposed plies under heat and pressure as the setting of the resin is accomplished, while yet retaining flowing properties in the glue for a time suitable to permit its interfacial distribution and wetting before setting. Suitability for such actions characterizes resin glues made from the resins of the present invention. The initial high viscosity resulting from the initial use of methyl cellulose is maintained during long periods of storage so that formulations of glue made from such resin are possible after long storage of the resin. Such glues minimize penetration, yet give the desired body for spreading application while having a less advanced resin than normally corresponds to that viscosity. Because the resin is less advanced, the period of fluidity in a heated plywood press is sufficiently prolonged, thus permitting better flow and distribution between plies under pressure, while at the same time the viscosity minimizes penetration, thus making possible high strengths, and in testing high percentages of wood failure upon rupture of the glue line in shear either originally dry, or wet or dry after wetting with water.

In formulating a glue for contact with wood or wood fibers, additional strong alkali is desirable for increasing the solubility of the resin in the water present and for increasing the rapidity of cure, especially in pressing plywood as hereinafter described. The high alkalinity of such a formulated resin glue tends to attack the wood, and this alkalinity may be reduced by also adding a buffering agent to lower the effective pH of the solution without necessarily changing the content of free alkali. Sodium and potassium carbonates are excellent buffering agents having these properties, but other agents or salts such as sodium acetate may also be used.

Filler material may be added along with water in formulating a glue. Both water and the filler material reduce the content of resin solids in the glue. Thus, glue cost is decreased, assuming resin solids to be more costly than filler. Water and filler may be added in controlled amounts to give suitable spreading. A small amount of pine oil or other suitable anti-foaming agents may be added to the glue formulation to prevent foaming in mechanical agitation incident to application, for example, to veneer in forming plywood. The following is an example of a formulation for glue for manufacturing plywood.

*Example II*

First make a solution of 20 parts of water, 2½ parts of sodium carbonate (anhydrous), and 4 parts of caustic soda. Add solid filler in the amount of 20 parts of material such as walnut shell flour or finely divided silica, to 100 parts of resin solution of the foregoing example. Then combine the two mixtures so prepared, and, if desired, add 1½ parts of pine oil.

The additional caustic soda employed in the formation increases the viscosity and enchances the dispersing power of the glue while thus delaying precipitation of resin, as in a glue spreader, and thereby avoiding a poorly-spreading glue. In other words, in use of such a glue, complete dispersion of the glue in a liquid form is desired prior to the desired actual advancement of the resin to a solid form, as in a plywood press. All this is additional reason why the original resin composition should not be too highly advanced. The addition of sodium carbonate to the glue along with any other salts in the original resin solution, increases the tendency towards precipitation. All caustic soda in the glue formulation counteracts this tendency. Carbon dioxide in the air is a factor tending to precipitate resin as it combines with free NaOH of the resin composition when the glue is exposed in a glue spreader.

Resin glue formulations, as above described, are applied to wood veneer and set in presses at elevated temperatures. In the case of three-ply panels each of $\frac{3}{16}$ inch thickness, with two panels together between the heated platens, a press is closed for 7 minutes at 280° F. platen temperature, during which time the resin bonding layers dry and set.

The invention may be carried out with any suitable phenols such as meta or para cresol, and other suitable aldehydes, such as acetaldehyde, which condense to form suitable thermosetting resins which are dispersible in suitable liquid forms, while employing methyl cellulose in a dispersed form to give viscosity greater than that derivable in the absence of methyl cellulose from the degree of polymerization or advancement of the phenolic-aldehyde condensation product actually present.

Commercial plywood manufactured with the resins described of the present invention has been found to be more uniform and of better bond than that heretofore attained with phenolic resins applied with the same spread of resin solids and pressed under like conditions.

The well-known variations in the phenolic resin art may be employed in carrying out the present invention, without departing from the spirit and scope thereof as expressed in the appended claims.

I claim:

1. The method which comprises heating and condensing to a dissolved water-soluble resin-forming condensation product 1 mole of phenol and about 1.87 moles of formaldehyde in water in the presence of alkali-metal-hydroxide catalyst and in the presence of methyl cellulose of the type soluble in alkaline aqueous solution, said methyl cellulose being dispersed in quantity to yield a liquid reaction mass, and conducting said reaction to a stage short of solidification of the mass when cooled to 25° C., thereby providing an alkaline aqueous solution of reactive resin-forming condensation product having viscosity derived in part from the methyl cellulose, forming a film-layer of aqueous liquid glue containing said resin-forming solution as a glue base between layers of solid material including at least one glue-absorbent layer, whereby the viscosity of the glue retards penetration of glue into said layer, and applying heat and mechanical pressure to said layers with said interfacial glue and drying out and thermosetting the resin-forming content thereof.

2. The method of producing plywood which comprises heating and condensing to a dissolved water-soluble resin-forming condensation product 1 mole of phenol and about 1.87 moles of formaldehyde in water in the presence of alkali-metal-hydroxide catalyst and in the presence of methyl cellulose of the type soluble in alkaline aqueous solution, said methyl cellulose being dispersed in quantity to yield a liquid reaction mass, and conducting said reaction to a stage short of solidification of the mass when cooled to 25° C., thereby providing an alkaline aqueous solution of reactive resin-forming condensation product having viscosity derived in part from the methyl cellulose, forming a layer of aqueous liquid glue containing said resin-forming solution as a glue base between layers of wood veneer to be united, whereby the viscosity aids in spreading the glue and minimizes penetration of resin into the wood, and applying heat and mechanical pressure to said layers with said interfacial glue and drying out and thermosetting the resin-forming content thereof.

3. The method of producing plywood which comprises heating and condensing to a dissolved water-soluble resin-forming condensation product 1 mole of phenol and about 1.87 moles of formaldehyde in water in the presence of alkali-metal-hydroxide catalyst and in the presence of methyl cellulose of the type soluble in alkaline aqueous solution, said methyl cellulose being dispersed in quantity to yield a liquid reaction mass, and conducting said reaction to a stage short of solidification of the mass when cooled to 25° C., thereby providing an alkaline aqueous solution of reactive resin-forming condensation product having viscosity derived in part from the methyl cellulose, formulating an alkaline aqueous liquid glue comprising said resin-forming solution as a glue base, and further comprising alkali-metal hydroxide and a buffer compound for lowering the pH from the pH otherwise resulting from said hydroxide, forming an interface of said liquid glue between layers of wood veneer to be united, whereby the viscosity aids in spreading the glue and minimizes penetration of the glue into the wood, and applying heat and mechanical pressure to said layers with interfacial glue and thermosetting and drying out the resin-forming content thereof.

4. The method of producing plywood which comprises heating and condensing to a dissolved water-soluble resin-forming condensation product 1 mole of phenol and about 1.87 moles of formaldehyde in water in the presence of alkali-metal-hydroxide catalyst and in the presence of methyl cellulose of the type soluble in alkaline aqueous solution, said methyl cellulose being dispersed in quantity to yield a liquid reaction mass, and conducting said reaction to a stage short of solidification of the mass when cooled to 25° C., thereby providing an alkaline aqueous solution of reactive resin-forming condensation product having viscosity derived in part from the methyl cellulose, formulating an alkaline aqueous liquid glue comprising said resin-forming solution as a glue base, and further comprising alkali-metal hydroxide, a buffer salt for lowering the pH of the solution from the pH otherwise effected by said hydroxide, and particles of solid filler, forming an interface of said liquid glue between layers of wood veneer to be united, whereby the viscosity aids in spreading the glue and minimizes penetration of the glue into the wood, and applying heat and mechanical pressure to said layers with interfacial glue and drying out and thermosetting the resin-forming content thereof.

5. The method which comprises heating and condensing to a dissolved water-soluble resin-forming condensation product 1 mole of phenol and about 1.87 moles of formaldehyde in water in the presence of alkali-metal-hydroxide catalyst and in the presence of about 2% by weight based on phenol of methyl cellulose having from 30% to 32% methoxyl content, and conducting said reaction to a stage short of solidification of the mass when cooled to 25° C., thereby providing an alkaline aqueous solution of reactive resin-forming condensation product having viscosity derived in part from the methyl cellulose, forming a film-layer of aqueous liquid glue containing said resin-forming solution as a glue base between layers of solid material including at least one glue-absorbent layer, whereby the viscosity of the glue retards penetration of glue into said layer, and applying heat and mechanical pressure to said layers with said interfacial glue and drying out and thermosetting the resin-forming content thereof.

6. The method which comprises heating and condensing to a dissolved water-soluble resin-forming condensation product 1 mole of phenol and about 1.87 moles of formaldehyde in water in the presence of alkali-metal-hydroxide catalyst and in the presence of about 2% by weight based on phenol of methyl cellulose having from 30% to 32% methoxyl content, and conducting said reaction to a stage short of solidification of the mass when cooled to 25° C., forming a layer of aqueous liquid glue containing said resin-forming solution as a glue base between layers of wood to be united, whereby the viscosity aids in spreading the glue and minimizes penetration of resin into the wood, and applying heat and mechanical pressure to said layers with said interfacial glue and drying out and thermosetting the resin-forming content thereof.

7. The method which comprises heating and condensing to a dissolved water-soluble resin-forming condensation product 1 mole of phenol and about 1.87 moles of formaldehyde in water in the presence of alkali-metal-hydroxide catalyst and in the presence of methyl cellulose of the type soluble in alkaline aqueous solution, said methyl celluose being dispersed in quantity to yield a liquid reaction mass, and conducting said reaction to a stage short of solidification of the mass when cooled to 25° C., thereby providing an alkaline aqueous solution of reactive resin-forming condensation product having viscosity derived in part from the methyl cellulose, forming a layer of aqueous liquid glue containing said resin-forming solution as a glue base between layers of wood to be united, whereby the viscosity aids in spreading the glue and minimizes penetration of resin into the wood, and applying heat and mechanical pressure to said layers with said interfacial glue and drying out and thermosetting the resin-forming content thereof.

RAYMOND G. BOOTY.

REFERENCES CITED

The following references are of record in the file of this patent:

UNITED STATES PATENTS

| Number | Name | Date |
| --- | --- | --- |
| 1,917,020 | Dent | July 4, 1933 |
| 1,919,163 | Jackson | July 18, 1933 |
| 2,150,697 | Nevin | Mar. 14, 1939 |
| 2,150,698 | Nevin | Mar. 14, 1939 |
| 2,178,566 | Dike et al. | Nov. 7, 1939 |
| 2,218,373 | Alexander | Oct. 15, 1940 |
| 2,233,875 | Schmidt | Mar. 4, 1941 |
| 2,260,006 | D'Alelio | Oct. 21, 1941 |
| 2,300,976 | Schenermann | Nov. 3, 1942 |
| 2,351,716 | Smith | June 20, 1944 |
| 2,360,376 | Van Epps | Oct. 17, 1944 |
| 2,389,418 | D'Alelio | Nov. 20, 1945 |

OTHER REFERENCES

The Merck Index, 5th ed., p. 512, pub. 1940 by Merck & Co., Inc., Rahway, N. J.

British Plastics, Aug. 1943, pages 168–170.